No. 644,810. Patented Mar. 6, 1900.
P. L. SYLVESTER.
MACHINE FOR MIXING AND PREPARING PLASTIC MATERIAL.
(Application filed Sept. 16, 1899.)
(No Model.) 4 Sheets—Sheet 1.
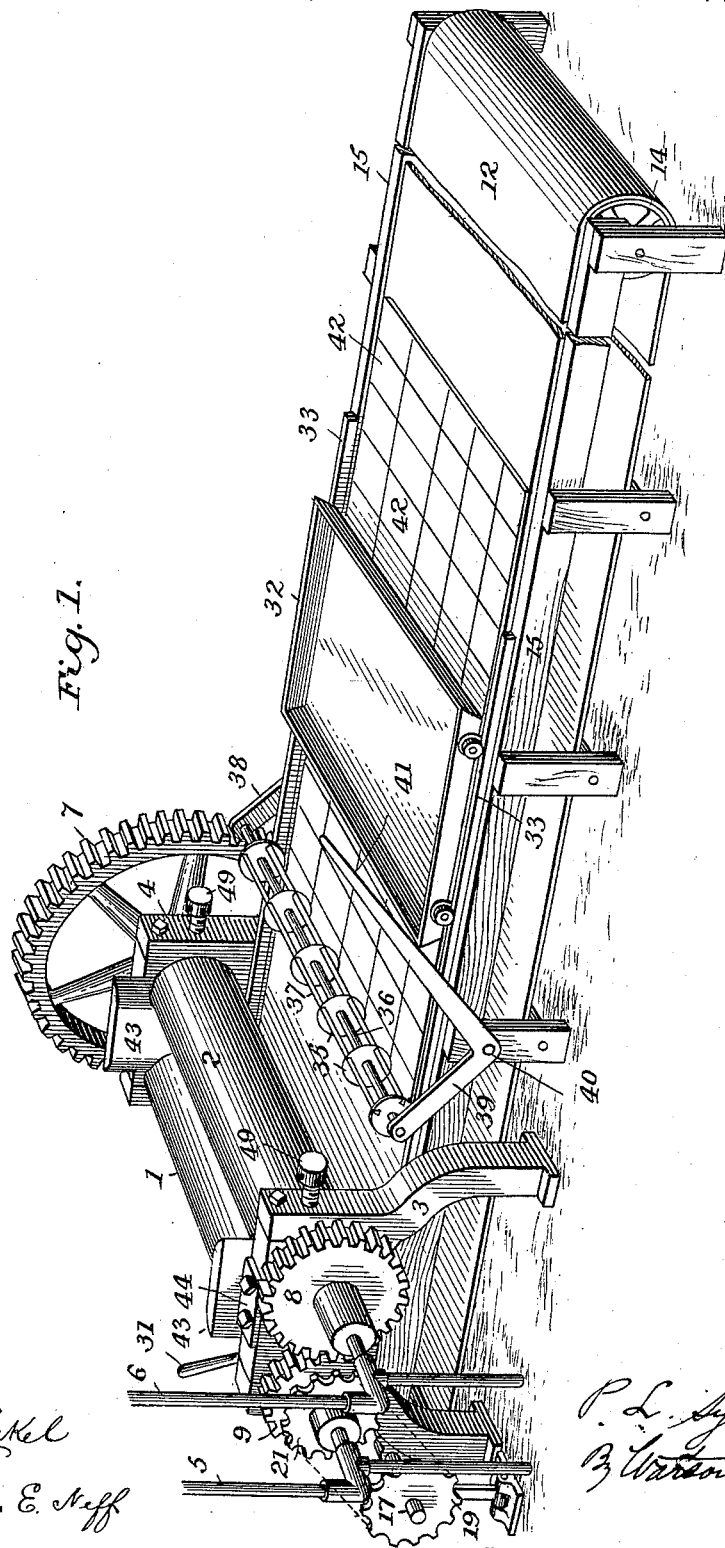

No. 644,810. Patented Mar. 6, 1900.
P. L. SYLVESTER.
MACHINE FOR MIXING AND PREPARING PLASTIC MATERIAL.
(Application filed Sept. 16, 1899.)
(No Model.) 4 Sheets—Sheet 2.
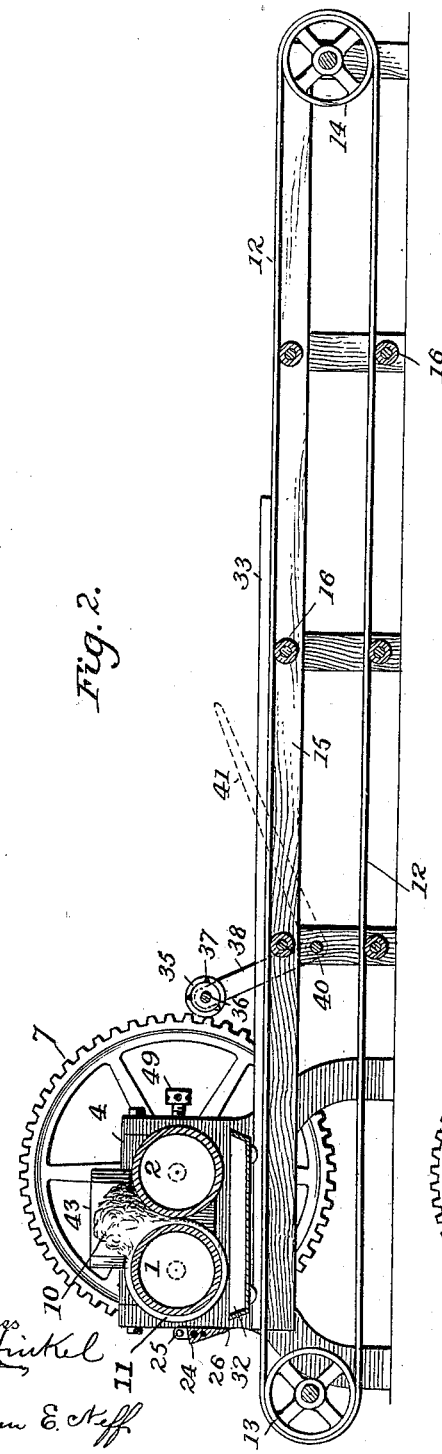
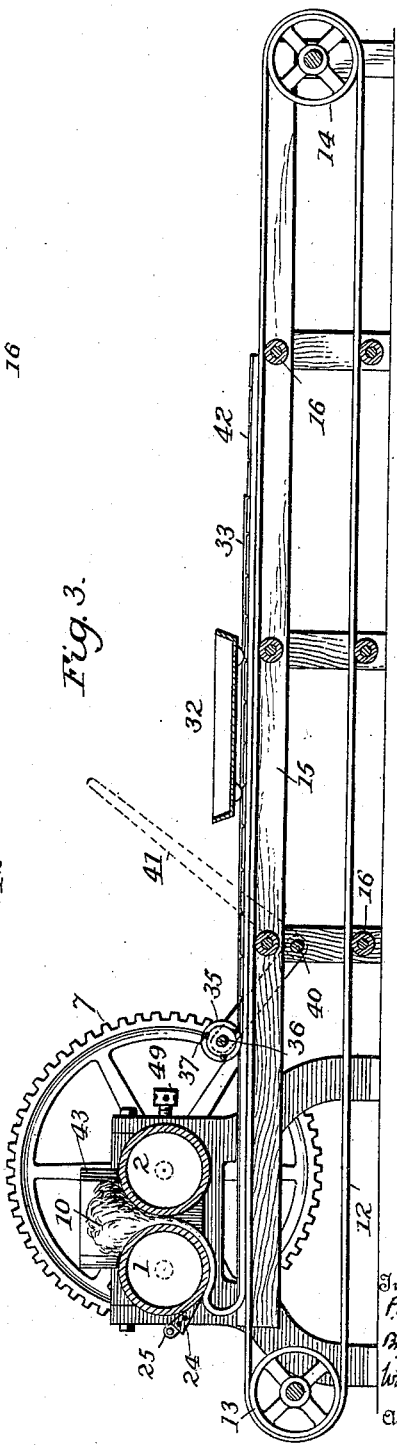

No. 644,810. Patented Mar. 6, 1900.
P. L. SYLVESTER.
MACHINE FOR MIXING AND PREPARING PLASTIC MATERIAL.
(Application filed Sept. 16, 1899.)
(No Model.) 4 Sheets—Sheet 3.
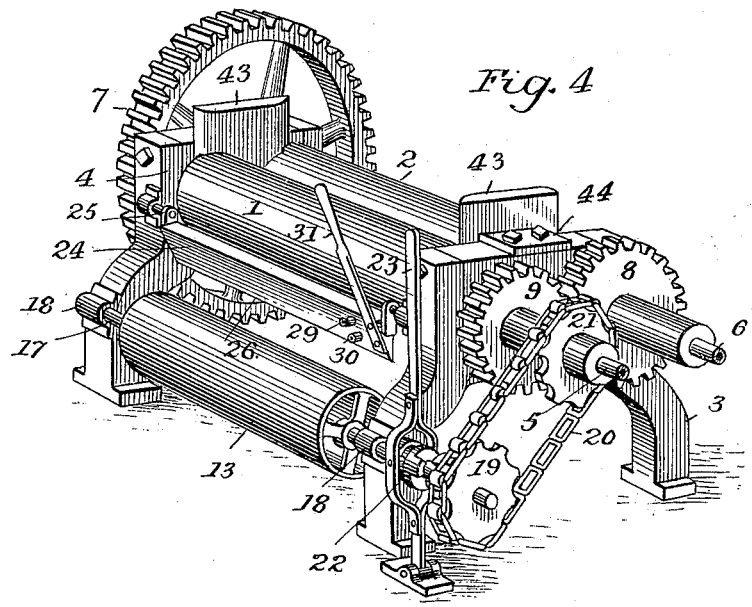
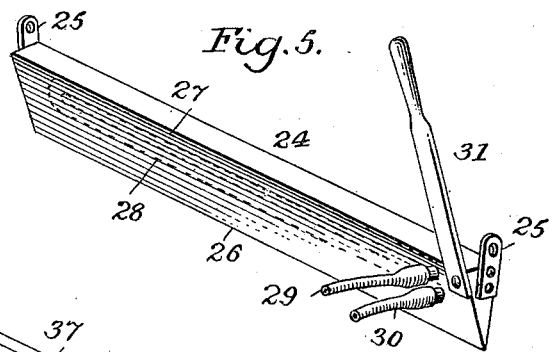
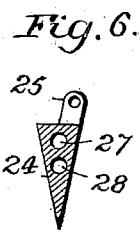
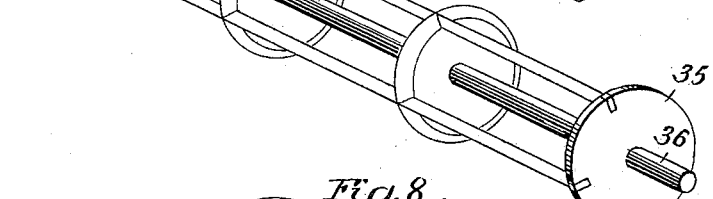
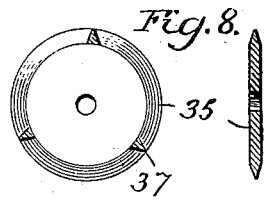
THE NORRIS PETERS CO., PHOTO-LITHO., WASHINGTON, D. C.

No. 644,810. Patented Mar. 6, 1900.
P. L. SYLVESTER.
MACHINE FOR MIXING AND PREPARING PLASTIC MATERIAL.
(Application filed Sept. 16, 1899.)
(No Model.) 4 Sheets—Sheet 4.

Witnesses
J. G. Hinkel
William E. Neff

Inventor
P. L. Sylvester
By Watson & Watson
Attorneys

UNITED STATES PATENT OFFICE.

PHILIP L. SYLVESTER, OF SCRANTON, PENNSYLVANIA.

MACHINE FOR MIXING AND PREPARING PLASTIC MATERIAL.

SPECIFICATION forming part of Letters Patent No. 644,810, dated March 6, 1900.

Application filed September 16, 1899. Serial No. 730,693. (No model.)

*To all whom it may concern:*

Be it known that I, PHILIP L. SYLVESTER, a citizen of the United States, residing at Scranton, in the county of Lackawanna and State of Pennsylvania, have invented certain new and useful Improvements in Machines for Mixing and Preparing Plastic Material, of which the following is a specification.

My invention relates to improvements in machines for mixing and preparing material which is of a plastic nature when heated and becomes hardened at ordinary temperatures, such as the material from which composition buttons and other similar articles are made; and it comprises a machine by means of which the plastic mass is first thoroughly mixed and incorporated and then laid out into sheet form and simultaneously marked off into squares or sections of convenient size for subsequent manipulation without the necessity of rehandling the mass.

By means of my improvements a large amount of manual labor which has heretofore been considered necessary is dispensed with and the quality and uniformity of the material are greatly improved by reason of the expeditious manner in which it is handled.

Figure 9:
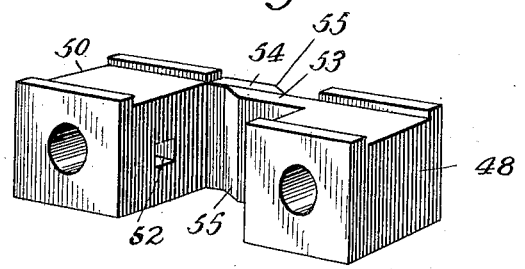
Figure 10:
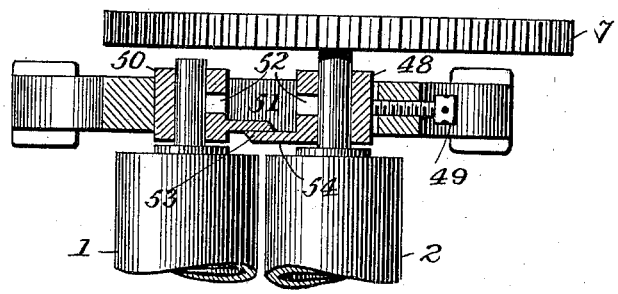
Figure 11:
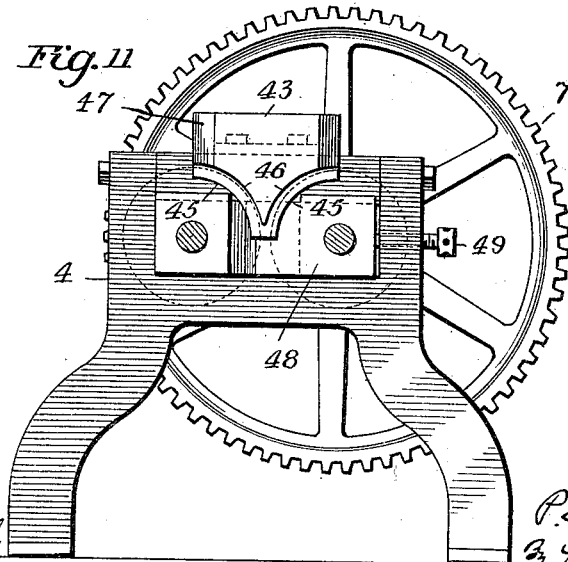

In the accompanying drawings, which illustrate my invention, Figure 1 is a perspective view of my improved machine. Figs. 2 and 3 are longitudinal sections through the same, illustrating the operation of the apparatus. Fig. 4 is a perspective view of the front of the machine. Fig. 5 is a similar view of the scraper-knife for removing the plastic material from the mixing-rolls. Fig. 6 is a cross-section through the scraper shown in Fig. 5. Fig. 7 is a perspective view of the scoring-knife for dividing the material into blocks or sections. Fig. 8 shows one of the circular scoring-knives in side view and in section. Fig. 9 is a perspective view of the pillow-blocks in which the mixing-rolls are journaled. Fig. 10 is a horizontal section through one of the end frames, showing the pillow-blocks in position; and Fig. 11 is a view of the inner side of one of the end frames, the mixing-rollers being indicated in dotted lines.

Referring to the drawings, 1 and 2 indicate a pair of hollow steam-heated mixing-rolls, which are adjustable toward and from each other, one roll being arranged to travel faster than the other. As shown in the drawings, the rollers are supported by end frames 3 and 4 and are heated through steam-pipes 5 and 6. The roller 2 is operated by means of a driving-gear 7, secured at one end of its shaft, and at the opposite end of said shaft a gear 8, meshing with a smaller gear 9 upon the shaft of the roller 1, drives the latter at a speed proportionately greater than the speed of the roller 2.

The plan of providing steam-heated rollers adjustable toward and from each other and traveling at different speeds for the purpose of mixing plastic material is well known in the art, and the novelty in this part of the present apparatus consists in the arrangement and construction of the bearings for the mixing-rolls, by which particles of the plastic material which may drop from the rolls are prevented from getting into the bearings when the rolls are moved apart, as will be hereinafter described.

The operation of mixing the material is illustrated in Fig. 2, wherein 10 indicates the batch of plastic material which is placed upon and between the rolls, and as the latter revolve toward each other a portion of the material (indicated by the reference-figure 11) adheres to the faster-running roll 1 and is carried around thereby and reincorporated with the mass until the latter becomes a homogeneous mixture. Heretofore after the batch has been thoroughly mixed it has been customary to remove a portion at a time from the rolls and pass it through independent blanking-rolls for the purpose of running it off into sheet form, after which it was transferred to cooling-tables. This operation of rehandling the material besides entailing extra labor and expense is not satisfactory, for the reason that in order to have the resultant material of uniform quality throughout it is necessary to remove the entire batch of material from the heated rolls as soon as it is of the proper consistency. If the material is not expeditiously removed from the rolls when of the proper consistency, there will, in some mixtures, be quite a perceptible difference in quality between the portion first removed from the rolls and the last portion, the portion first removed being more plastic than the last portion, which has been unduly subjected to heat and the mixing process.

In order to remove the material from the rolls without delay after it has reached the proper stage in the mixing process, so as to insure uniformity in quality and to form it into sheets and simultaneously score said sheets, so that it may be broken into small squares after becoming cooled and hardened, I provide a series of coöperating devices, including an endless belt 12, which is horizontally arranged beneath the mixing-rolls and passes around rollers 13 and 14, arranged at opposite ends of a long belt-frame 15, said frame being provided with small rollers 16, upon which the intermediate portion of the belt is supported.

As shown in the drawings, the roller 13, which is the driving-roller for the belt, is secured to a shaft 17, mounted in suitable bearings 18 upon the front of the end frames of the machine. The shaft 17 extends outwardly beyond the end frame 3 and carries a loosely-mounted sprocket-wheel 19, which is connected by a chain 20 to a sprocket-wheel 21, secured upon the shaft of the faster-running roll 1. A clutch 22, splined to the shaft 17 and operated by a lever 23, is adapted to engage a clutch member upon the sprocket-wheel 19, so that the roller 13 of the traveling belt may be set in motion or stopped at will by the movement of said lever. The size of the roller 13 and the relative sizes of sprockets 19 and 21 are such that the speed of the belt when in motion will be equal to the peripheral speed of the mixing-roller 1.

Upon the end frames in front of the mixing-roller 1, I arrange an artificially-cooled scraper-knife 24, which is pivotally supported by means of ears 25, so that its sharpened edge 26 may be swung into contact with the roller 1, as indicated in Fig. 3, whereby the plastic material may be scraped from said roller and deposited upon the belt, which is previously set in motion by throwing over the clutch-lever 23. The scraper-knife, as shown in Figs. 5 and 6, is provided with channels 27 and 28, which extend from end to end of the scraper and through which cold water is continuously passed while in use in order to keep the scraper cool and prevent the plastic material from adhering to it, the liquid being carried to and from the channels by means of flexible pipes 29 and 30. The scraper is provided with a handle 31, by means of which it may be readily swung on its pivotal points into and out of contact with the mixing-roll. This artificially-chilled knife for removing the heated plastic material from the rolls is an important feature of my invention, as the material will not adhere to the cold surface and immediately falls to the belt below. As the belt and the mixing-roll 1 travel at the same speed, the plastic material will be carried out upon the belt in a sheet of uniform thickness. The length of the belt is such that an entire batch of material may be run off upon its upper surface. As soon as the material is deposited upon the belt the clutch 22 is thrown out of engagement with the sprocket-wheel 19, thereby stopping the movement of the belt.

In order to score the material while in sheet form and in its plastic state, so that it may after hardening be broken into sections of a size convenient for subsequent manipulation, I provide a scoring-knife (shown in detail in Figs. 7 and 8) consisting of a series of disk blades 35, mounted at convenient distances apart upon a shaft 36 and having set transversely into their peripheries a series of blades 37, arranged equidistantly apart. The shaft 36 is mounted to turn in the ends of arms 38 and 39, which are arranged at opposite sides of the frame 15, said arms being secured to a rod 40, which is pivoted in the frame and extends through from side to side of the machine. The scoring-knife may be raised and lowered by means of a handle 41, connected with the arm 39. By raising said handle the scoring-knife may be lowered almost into contact with the belt, as shown in Fig. 3, so that when the plastic material passes beneath the knife the latter will be set in motion thereby and the disks 35 will score the material longitudinally, while the transverse blades will score it transversely, thus marking the sheet off into rectangular sections 42, as shown in Fig. 1. After the material has thus been run off into sheet form and scored it is allowed to cool upon the belt, after which it may be broken along the scored lines and removed.

The time required for cooling in general is about equal to the time required for mixing another batch, so that the machine may be used continuously, one batch being mixed while the other is cooling.

In order to catch any particles of the plastic material which may drop through between the rolls while the mixing process is going on, I provide a pan 32, which is supported upon wheels traveling upon tracks or ways 33, arranged upon the upper side of the frame 15. During the mixing process the pan is placed under the rolls, as shown in Fig. 2, to catch any material which may drop from the rolls. During the operation of scraping the material from the rolls and depositing it upon the belt the pan 32 may be moved backward out of the way, as shown in Fig. 3.

The arrangement for raising the scoring-knife permits the pan 32 to be moved backward and forward along the tracks without interference from said knife.

For the purpose of confining the plastic material to the rolls during the mixing operation I provide guards 43, which are secured to the end frames by means of brackets 44. The lower edges 45 of these guards extend downward between the rolls and the end frames, as illustrated in Fig. 11, and the upper portions of the guards project over the ends of the rollers, as shown in Figs. 1 and 4, the projecting portions of the guards being reversely curved, as shown at 46, so as to conform to the curvature of the rolls. The sides of the guards are tapered or rounding, as shown at 47, so that any material which may find its way out onto the ends of the rolls will be forced back upon coming in contact with the tapering sides.

The rollers are adjustable relatively to each other in order to vary the distances between them during the mixing process. For this purpose the roller 2 is mounted in bearings 48, which are ajustable by means of set-screws 49, extending through the end frames, while the roller 1 is mounted in stationary bearings 50. The maximum distance between the rollers during the process of mixing does not exceed the length of one of the teeth upon the gears 8 and 9, so that the teeth of said gears will always mesh with each other. The bearings are arranged in horizontal guideways 51 in the end frames. It will be seen that when the bearing 48 is moved outward, so as to separate the rolls, a space will be left between the roll 2 and the curved shoulders 46 of the guards. This separation of the roll from the curved shoulder permits small particles of plastic material to adhere to the outer ends of the rolls and eventually to work off over said ends. In order to prevent these particles from getting into the oil-chambers 52, the journal-blocks 48 and 50 are provided with overlapping flanges 53 and 54, respectively, which are of the same height as the guideway in which said blocks are supported, and these flanges effectually prevent the material from passing through to the oil-chambers. These overlapping flanges are formed with beveled ends 55, so that any plastic material which may fall on and adhere to the flanges will be sheared off by said beveled ends when the bearings are moved by means of the set-screws.

Having described my invention, what I claim, and desire to secure by Letters Patent of the United States, is—

1. In a machine for mixing and preparing plastic material, the combination with the heated mixing-rolls having different peripheral speeds, of a conveyer-belt below said rolls arranged to travel at approximately the same speed as the periphery of the faster-running roll, and an artificially-cooled scraper movable toward and from the face of said roll.

2. In a machine for mixing and preparing plastic material, the combination with the heated mixing-rolls having different peripheral speeds, of a cold scraper adapted to scrape the material from the faster-running roll, and a conveyer arranged to receive the material scraped from said roll and to carry it off in sheet form.

3. In a machine for mixing and preparing plastic material, the combination with the mixing-rolls having different peripheral speeds, of a scraper-knife adapted to scrape the material from the faster-running roll, a conveyer below said rolls arranged to travel at approximately the same speed as the faster-running roll, and means for stopping and starting said conveyer.

4. In a machine for mixing and preparing plastic material, the combination with the heated mixing-rolls having different peripheral speeds, of a scraper adapted to scrape the plastic material from the faster-running roll, a conveyer-belt below said rolls arranged to travel at approximately the same speed as the periphery of the faster-running roll and adapted to receive the material scraped from said roll, and a scoring-knife arranged to score the material as it passes along on the belt.

5. In a machine for mixing and preparing plastic material, the combination with the heated mixing-rolls having different peripheral speeds, of a scraper adapted to scrape the plastic material from the faster-running roll, a conveyer-belt below said rolls arranged to travel at approximately the same speed as the periphery of the faster-running roll and adapted to receive the material scraped from said roll, and a scoring-knife journaled above the belt and consisting of a series of disks and one or more bars arranged transversely to said disks.

6. In a machine for mixing and preparing plastic material, the combination with the mixing-rolls and the scraper of the belt-frame below and extending rearwardly from said rolls, the conveyer-belt extending over said frame, the scoring-knife adjustable toward and from said belt, and the pan or receptacle movable upon ways longitudinally of said frame, substantially as described.

7. In a machine for mixing and preparing plastic material, the combination with the mixing-rolls, of the conveyer-belt beneath said rolls, the driving-roller for said belt secured to a suitable shaft, a sprocket wheel or gear loosely mounted on said shaft and geared to the shaft of one of said mixing-rolls, and a clutch for connecting said wheel or gear to its shaft.

8. In a machine for mixing and preparing plastic material, the combination with the mixing-rolls having different peripheral speeds, of a scraper-knife movable toward and from the face of the faster-running roll and having passage-ways therein through which a cooling fluid may be passed, as and for the purpose set forth.

9. In a machine for mixing and preparing plastic material, the combination with the mixing-rolls, of the end frames having guideways therein, bearings for said rolls located within the guideways and having overlapping flanges the ends of which are beveled or sharpened, the bearings of one of said rolls being adjustable toward and from the bearings of the other roll.

In testimony whereof I affix my signature in presence of two witnesses.

PHILIP L. SYLVESTER.

Witnesses:
ROBERT WATSON,
CHAS. R. CONNELL.